United States Patent [19]
Carey et al.

[11] 3,739,363
[45] June 12, 1973

[54] ADJUSTABLE TAPE PATH LENGTH

[75] Inventors: Raymond E. Carey; Andy S. Robertson, both of Houston, Tex.

[73] Assignee: AMF Incorporated, White Plains, N.Y.

[22] Filed: Apr. 17, 1972

[21] Appl. No.: 244,426

[52] U.S. Cl. 340/174.1 L, 179/100.2 B, 179/100.2 K
[51] Int. Cl. .................. G11b 15/18, G11b 27/04
[58] Field of Search............ 340/174.1 D, 174.1 H,
340/174.1 P, 174.1 L; 346/33 P, 33 F;
179/100.2 B, 100.2 CA, 100.2 K, 100.2 MD,
100.2 RE

[56] References Cited
UNITED STATES PATENTS
3,172,096  3/1965  Pezke .......................... 340/174.1 B Primary Examiner—Vincent P. Canney
Attorney—George W. Price et al.

[57] ABSTRACT

Method and apparatus for producing a multitrack inspection log of anomaly signals produced by pipeline nondestructive inspection apparatus having two longitudinally spaced sets of anomaly sensors. Inspection apparatus produces on a magnetic tape a multitrack record of anomaly signals generated by respective sensors of the two sets. Magnetic recording playback apparatus includes two spaced magnetic head stacks and means located therebetween to adjust length of path the magnetic tape travels between the head stacks. Proper adjustment of path length assures that all anomaly signals corresponding to a given anomaly that is sensed by both sets of sensors appear in transverse alignment in the respective recording tracks of the multitrack inspection log.

11 Claims, 9 Drawing Figures

Patented June 12, 1973 3,739,363

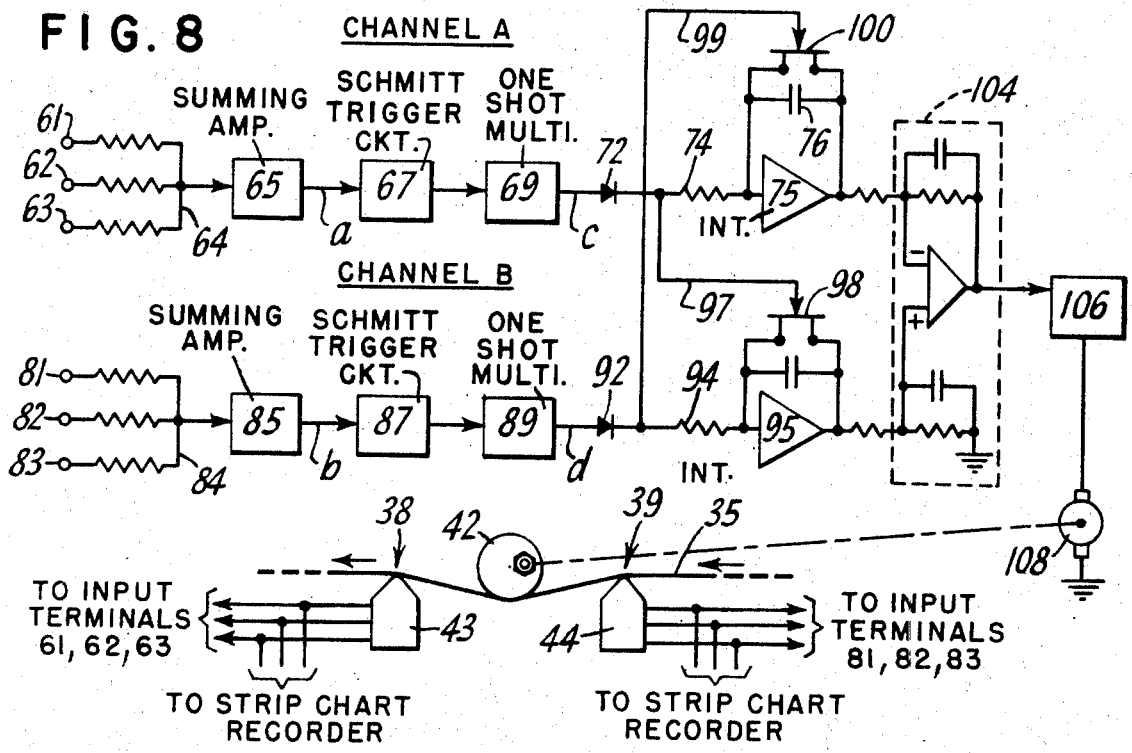
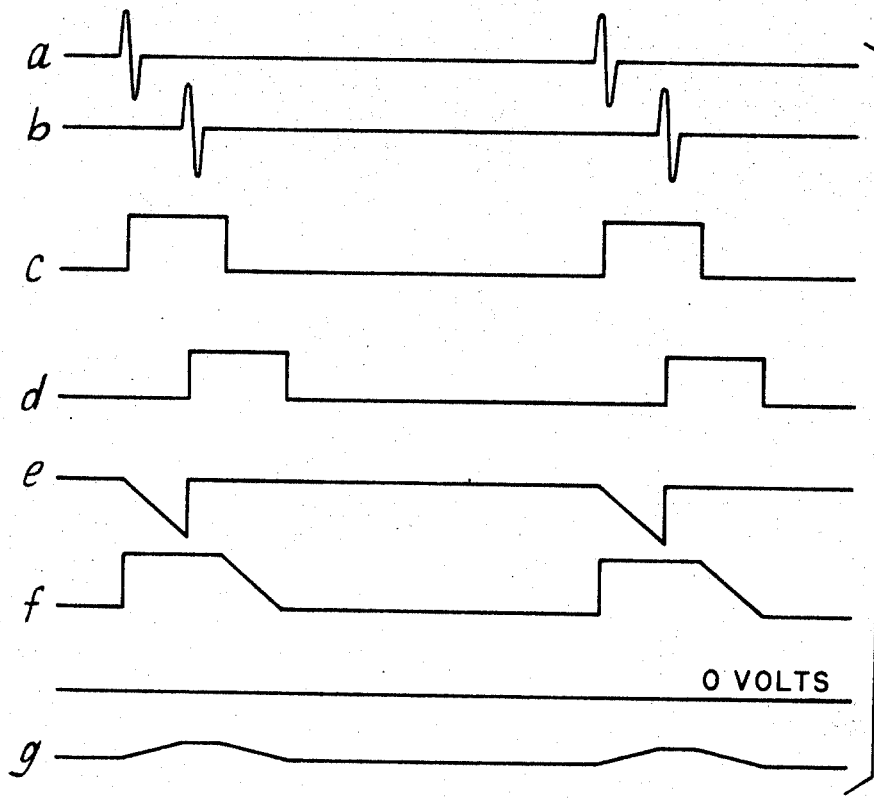
FIG. 9

ADJUSTABLE TAPE PATH LENGTH

BACKGROUND OF THE INVENTION

Buried pipelines that carry natural gas, crude oil and petro-chemical products are nondestructively inspected to determine the condition and characteristics of the pipeline. The inspection is performed by passing inspection apparatus through the interior of the pipeline while it is in operation. The apparatus is carried by a pipeline pig which is propelled through the line by the product flowing therethrough. In the inspection of a pipeline to determine the condition of the pipe wall, for example, various known nondestructive testing techniques may be employed. These techniques may include magnetic flux leakage inspection, eddy current inspection, and a magnetic reluctance inspection technique, to name a few. These types of inspection techniques commonly employ a plurality of individual sensors which are arranged circumferentially about the body of the inspection pig and extend outwardly to slide along the inside surface of the pipeline. To assure that the entire circumference of the pipeline is inspected without gaps occurring between adjacent sensors, the sensors commonly are arranged in two longitudinally spaced sets wherein the sensors of one set are angularly displaced from, and slightly overlapping, the sensors of the other set in such a manner that adjacent circumferential segments of the pipe wall are inspected by respective sensors from the two sets. The two sets of sensors are longitudinally spaced a distance which may range from 3 to 12 inches, for example, depending on the size of the pig.

When a sensor detects an anomaly in the wall of the pipe it produces an electrical signal. Each sensor is connected to a respective recording head of a multitrack magnetic tape recorder, for example, which is carried by the inspection pig. Multitrack recording apparatus commonly employs two spaced recording head stacks wherein one head stack includes a plurality of recording heads for recording on the even numbered tracks of the tape and the other head stack includes a plurality of recording heads for recording on the odd numbered tracks. This type of equipment is common in the art and the recording on alternate track by the respective recording head stacks is called interlace recording. The spacing between the two recording head stacks is a fixed distance and has been somewhat standardized in the industry. In recording equipment for recording on 33 tracks, for example, the spacing is 1.5 inch.

With the arrangement of inspection sensors in two spaced sets and the use of recording equipment utilizing two spaced recording head stacks, as described above, the sensors in the first set, called the leading set, all pass over a girth weld in the pipeline at the same time and produce a first set of simultaneously occurring electrical signals which are coupled to the recording heads of the first recording head stacks. These signals are recorded on alternate tracks of the magnetic recording tape. A short time thereafter the sensors of the second set, called the trailing set, all pass over that some girth weld and produce a second set of simultaneously occurring electrical signals which are recorded by the second recording head stack on the alternate tracks of the magnetic recording tape which are intermediate the tracks that the first set of signals were recorded on. After the inspection pig has completed its inspection run it is recovered from the pipeline and the magnetic tape is transcribed, or played back, to provide a visual record of the anomalies detected in the pipeline. This record includes indications of the girth welds in the pipeline which serve as useful reference data to indicate on the inspection record increments of length along the pipeline. However, because of the longitudinal spacing of the two sets of sensors, the representations of girth weld signals from the leading set of sensors appear on the visual record at location that are different from the corresponding girth weld representations emanating from the trailing set of sensors. This complicates the task of correlating the recorded girth weld signals and gives rise to possible confusion of girth weld signals with other recorded anomaly signals which appear on two or more recorded tracks of the record.

It therefore is desirable to provide means for producing an inspection record on which representations of a girth weld as detected by all inspection sensors are aligned and correlated in space and time relationship.

SUMMARY OF THE INVENTION

In accordance with the present invention, nondestructive inspection apparatus having two spaced sets of circumferentially arranged anomaly sensors is passed through a section of pipeline. The leading set of sensors first detects a girth weld in the pipeline and produces a first set of simultaneously occurring anomaly signals. A short time later the trailing set of sensors detects the same girth weld and produces a second set of simultaneously occurring anomaly signals. Both sets of signals are recorded in interlaced fashion on multitrack magnetic tape recording apparatus carried by the inspection apparatus. Because the spacing between the two sets of sensors is different from the separation between the two magnetic recording head stacks of the recording apparatus and because the speed of the sensors past the girth weld is different from the speed of the magnetic tape, one set of anomaly signals is recorded in transverse alignment on alternate tracks of the magnetic tape and the second set of anomaly signals is recorded in transverse alignment on alternate tracks that are intermediate the first mentioned alternate tracks. The two sets of signals are recorded at longitudinally spaced locations on the magnetic tape.

To produce an inspection log of the anomaly signals, conventional magnetic tape playback apparatus having two magnetic head stacks is used. The head stacks are spaced apart a fixed distance. To assure that the two sets of anomaly signals appear on the inspection log in transverse alignment at a single transverse location across the log, means are added to the playback apparatus to adjust the length of the path that the tape travels between the two head stacks. The adjustment means may be a disc-shaped cam located between the two head stacks and whose peripheral edge engages the magnetic tape so as to define the path of travel of the tape. The cam may be rotated to different angular positions to vary its line of engagement with the tape and thus to vary the path length. The path length is adjusted to assure that the two spaced locations on the magnetic tape where the two sets of anomaly signals are recorded are in registration with the inspection playback head stacks. With this relationship, both sets of anomaly signals will be transcribed simultaneously and may be recorded in transverse alignment on a multitrack strip chart recorder which produces the visual inspection log.

To assure the proper alignment of the recorded anomaly signals on the inspection log even though the speed of the inspection apparatus through the pipeline varies, the cam may be included in a follower or tracking system which is responsive to one or more signals having a characteristic which is a function of the speed of the inspection apparatus through the pipeline. The position of the cam then is automatically controlled as a function of the speed of the inspection apparatus through the pipeline.

BRIEF DESCRIPTION OF THE DRAWINGS

FIG. 8 is a simplified diagram of a system for automatically producing a desired inspection log of the type represented in FIG. 6; and FIG. 9 is a series of waveforms useful in explaining the operation of the system of FIG. 8.

DESCRIPTION OF THE PREFERRED EMBODIMENT

Figure 2:
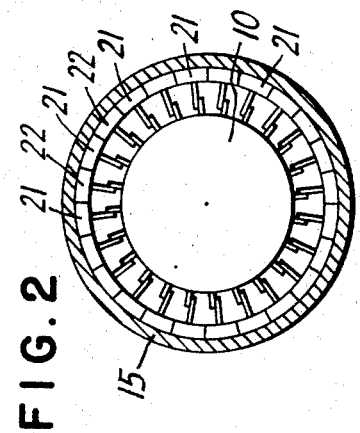
FIGS. 1 and 2 are simplified illustrations of inspection apparatus useful for performing nondestructive inspection of a pipeline.
Figure 1:
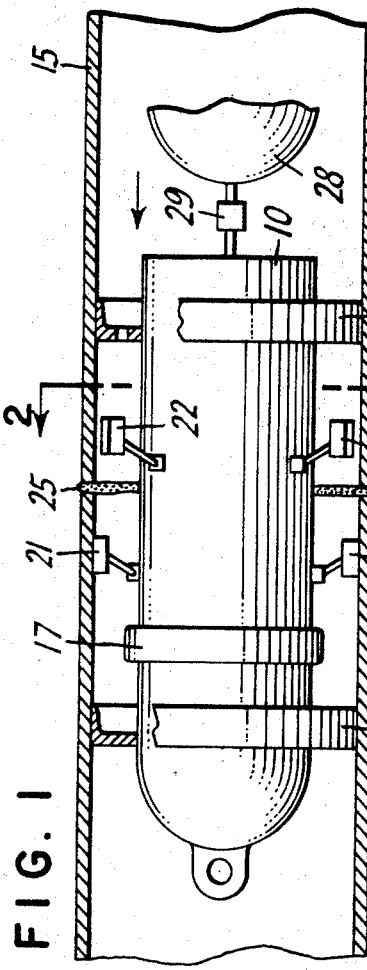

The pipeline inspection pig 10 illustrated in simplified form in FIGS. 1 and 2 is comprised of a housing portion 11 having elastomeric cups or packers 11 and 12 secured thereto. Cups 11 and 12 are in sliding engagement with the inner circumferential surface of the pipe wall 15. Fluid being transported through the pipeline urges against cups 11 and 12 and propels pig 10 through the pipeline.

For performing a magnetic flux leakage inspection of the pipe wall 15 as the pig moves therethrough, a source of magnetic flux such as solenoid 17 is disposed about the housing 11 of pig 10 and establishes a magnetic field that extends into pipe wall 15 to establish therein a longitudinally directed magnetic flux field throughout the full circumference of the pipe wall. If desired, magnetic pole pieces may be used in association with solenoid 17 to improve the coupling of magnetic flux into pipe wall 15. Resilient, flux conductive pole pieces have been used successfully.

It is well known that a nonuniform distribution of the magnetic flux field will exist along the surface of the pipe adjacent an anomaly in the pipe wall. Anomaly sensor means such as wire coils are carried in housings 21 and 22, commonly called search shoes, that are urged, by means not illustrated, into contact with the inner surface of pipe wall 15. For simplicity of illustration in FIG. 1, only several search shoes are illustrated. The search shoes are arranged in two sets, each set lying in a respective plane transverse to the pipe axis. A first set 21, the leading set, is disposed about the housing 11 of pig 10 and a trailing set 22 is displaced behind the leading set by a distance that may range from eight to twelve inches, for example. FIG. 2 illustrates more completely the arrangement of the search shoes. It is seen that the circumferentially spaced shoes 21 in the leading set cover respective spaced angularly segments of the pipe wall and shoes 22 in the trailing set are circumferentially spaced relative to shoes 21 so that, together, shoes 21 and 22 scan the entire circumference of pipe wall 15.

It will be seen in FIG. 1 that leading shoes 21 will first pass over an anomaly such as girth weld 25 and all sensors in shoes 21 will produce electrical anomaly signals substantially at the same time. A short time later trailing shoes 22 will pass over girth weld 25 and all sensors in shoes 22 will then produce electrical anomaly signals.

The inspection apparatus includes multitrack magnetic tape recording apparatus located either in housing portion 11 or in another housing 28 attached to pig 10 by a pivot joint 29. The recording apparatus is commercially available equipment which includes two spaced stacks of magnetic recording heads. The individual recording heads of one stack are connected to respective sensors of the leading set of shoes 21 and the recording heads of the other stack are connected to the respective sensors of the trailing set of shoes 22. As is common in multitrack recording equipment the recording heads of the first stack record on alternate tracks of the tape and the recording heads of the second stack record on alternate tracks that are located intermediate those associated with the first stack. This is referred to as interlacing.

Figure 3:
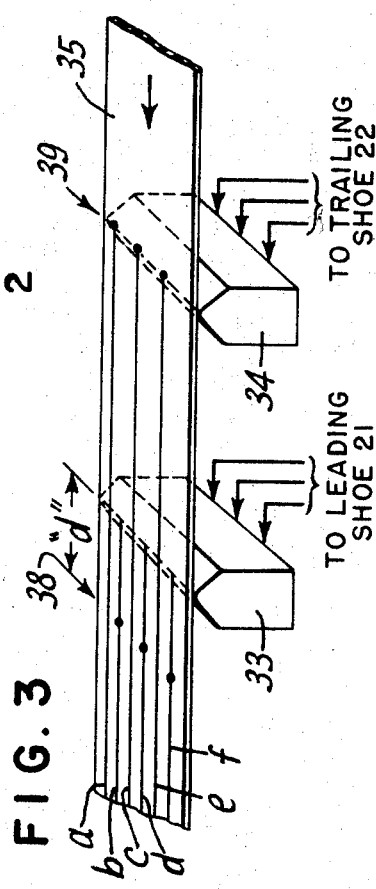
FIG. 3 is a simplified illustration of recording apparatus for recording anomaly signals produced by the inspection apparatus of FIG. 1 and 2.

This is illustrated in simplified form in FIG. 3 wherein the recording heads of the first stack 33 record signals from respective sensors of the leading set of shoes on tracks $b$, $d$, and $f$ of magnetic tape 35, while the recording heads of the second stack 34 record signals from respective sensors of the trailing set of shoes on tracks $a$, $c$, and $e$. For simplicity of illustration and description, only six recording tracks are shown in FIG. 3. Of course, the number of tracks, and thus the number of recording heads in the two stacks 33 and 34, must at least equal the number of sensors in the two sets of shoes 21 and 22.

In the recording equipment, the spacing between recording head stacks 33 and 34 typically might be one and one-half inches, this being different from the spacing between the leading and trailing sets of search shoes 21 and 22. Furthermore, the speed of magnetic tape 35 moving past head stacks 33 and 34 is different from the speed of the two sets of search shoes 21 and 22 moving through pipeline 15. This gives rise to a situation represented in FIG. 3 wherein as the leading search shoes 21 swept past girth weld 25, FIG. 1, the sensors in the search shoes produced electrical signals which were coupled to respective recording heads in stack 33. The signals were recorded on respective tracks $b$, $d$, and $f$ at a location 38 on magnetic tape 35. As pig 10 continued to move through the pipeline trailing shoes 22 next swept past girth weld 25 and the associated sensors produced electrical signals which were coupled to respective recording heads in stack 34. These signals were recorded on respective tracks a, c, and e at a location 39 on tape 35.

Because the search shoes 21 and 22 lie in spaced planes transverse to the axis of the pipeline, the recorded signals associated with the respective search shoes appear on tape 35 in transverse alignment at the respective locations 38 and 39. It is seen in FIG. 3 that the spacing between the recorded signals at locations 38 and 39 differs from the spacing between head stacks 33 and 34 by a distance d which is a direct function of the physical separation between the two sets of search shoes 21 and 22 and of the tape speed of tape 35, and an inverse function of the speed of the pig through the pipeline.

After the inspection apparatus has completed an inspection run through a pipeline the magnetic tape 35 is transcribed, or played back, in recording apparatus such as a pen and ink strip chart recorder or a light beam strip chart recorder to provide a visual record, or log, which is examined to determine the condition of the pipeline. The playback equipment includes two spaced magnetic head stacks similar to stacks 33 and 34. The spacing between the playback head stacks usually is a standard fixed distance, and likely will be the same as the spacing between stacks 33 and 34 of FIG. 3. Therefore, the visual record which is produced by the playback equipment is a log on which the girth weld signals appear as illustrated in FIG. 4 wherein there again is a longitudinal spacing between the girth weld indications on tracks a, c, and e and those on tracks b, d, and f. This spacing between corresponding girth weld signals sometimes makes interpretation of the log difficult and time consuming, particularly in situations where other anomaly signals emanate from regions of the pipeline near girth welds.

Figure 5:
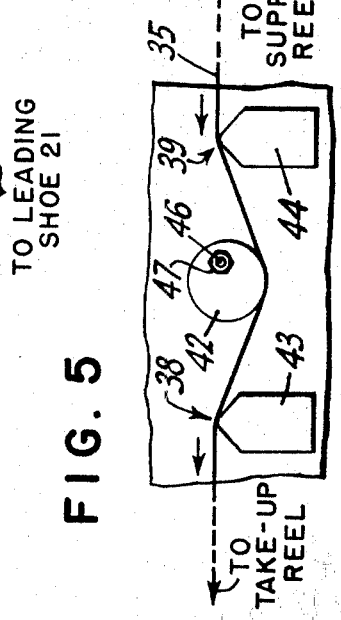
FIG. 5 is a simplified illustration of magnetic tape playback apparatus modified in accordance with the teachings of the present invention.

In accordance with this invention the longitudinal displacement between corresponding girth weld signals on the various tracks of the log is eliminated by utilizing means disposed between the two head stacks of the playback recording apparatus to increase the length of the path of travel of the tape between the two head stacks. As illustrated in FIG. 5, this may be accomplished by employing a cam 42 located between the two magnetic head stacks 43 and 44 which transcribe, or playback, the signals recorded on the magnetic tape 35 which has been recovered from the inspection pig 10 after an inspection run has been completed. Cam 42 is mounted on the playback apparatus 45 by means of a threaded stud 46 and nut 47. Cam 42 may be circular in cross section, as illustrated, and has an eccentrically located aperture for receiving stud 46. The cam 42 may be made of stainless steel having a highly polished peripheral edge past which the tape 35 slides.

Figure 4:
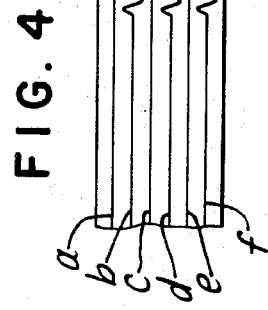
FIG. 4 is an illustration of the readout on an inspection log of the magnetic tape record of FIG. 3, without the use of the present invention.
Figure 6:
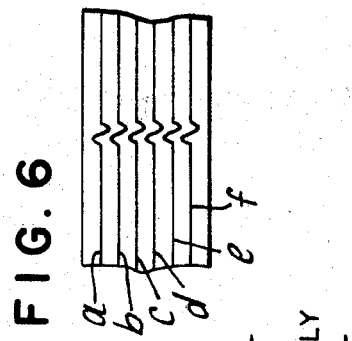
FIG. 6 is a representation of an inspection log produced by playback apparatus of this invention to achieve alignment of girth weld signals on all tracks of the log.

In operation, a short section of tape 35 may be run through the playback apparatus to provide a short strip of a log, such as in FIG. 4, so that the longitudinal spacing between the two sets of girth weld signals on the various record tracks may be determined. The angular position of cam 42 about its eccentric axis of rotation then is adjusted to lengthen the path that tape 35 follows between magnetic head stacks 43 and 44. This procedure may be repeated until precise alignment of girth weld signals is achieved on all recording tracks of the log, as illustrated in FIG. 6. Cam 42 remains fixed after alignment of the signals is achieved. Alternatively, an index marker on cam 42 and a fixed scale of angular indicia, or vice versa, may be used to correlate the rotary position of the cam to the length of the path that the tape travels between head stacks 43 and 44. With the proper adjustment of cam 42 the recorded signals at locations 38 and 39 on tape 35 will be simultaneously sensed by the magnetic heads of stacks 43 and 44 to provide the aligned recorded signals on the log, as shown in FIG. 6.

Figure 7:
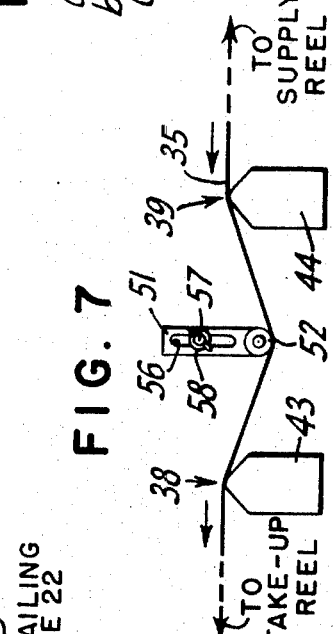
FIG. 7 is a simplified illustration of an alternative embodiment of playback apparatus constructed in accordance with this invention.

Other arrangements may be utilized to increase the length of the path that tape 35 travels between head stacks 43 and 44. In FIG. 7 a vertically adjustable bar 51 has a roller 52 extending outwardly from its bottom end. Tape 35 is engaged by roller 52, and as bar 51 is moved downwardly the path length of tape 35 between head stacks 43 and 44 is increased. As illustrated, an alongated slot 56 in bar 51 receives a stud 57 which is secured to the playback apparatus. A nut 58 threaded on stud 57 holds bar 51 in a desired position.

As described above, cams 42 and 52 are fixed in position once the alignment of girth weld signals is achieved. The entire magnetic tape 35 then may be transcribed to provide a visual log. This procedure usually will be satisfactory if the pipeline was transporting a liquid product and the liquid moved through the pipeline with a relatively uniform speed. In a pipeline that is transporting a gas, such as methane, the gas is compressed at the compressor stations and expands downstream from the compressor stations. This causes an inspection pig to change speed as it moves through the pipeline. Consequently, one fixed setting of the cams 42 and 52 will not assure that the girth weld signals on all tracks of the inspection log will remain aligned as desired. Alignment of the girth weld signals on the inspection log may be maintained, irrespective of the speed of the inspection pig, by having the angular position of cam 42, FIG. 5, for example, controlled by a follower or tracking system which operates in response to one or more signals that have some characteristic or relationship that is a function of the pig speed.

Such a system is illustrated in FIG. 8. Referring first to channel A, the input terminals 61, 62, 63 are connected to respective magnetic heads in head stack 43 so that the input signals to channel A correspond to signals generated by sensors in the leading set of search shoes 21, FIG. 1. These input signals are summed by means of resistor network 64 and summing amplifier 65 to produce an output signal, FIG. 9a, which is coupled to Schmitt trigger circuit 67. Trigger circuit 67 operates to produce an output pulse only when the output from summing amplifier 65 exceeds a predetermined magnitude. This magnitude is chosen to assure triggering of circuit 67 only when recorded signals occur simultaneously on all tracks of the magnetic tape 35 being transcribed by magnetic head stack 43, these being tracks b, d, f, FIGS. 3 and 4, for example. This means that all sensors of leading set of search shoes 21 have sensed an anomaly at the same time. This arrangement virtually assures that only a girth weld will give rise to the triggering of circuit 67 since it is very unlikely that any other type of anomaly in the pipeline will be of such extent as to be sensed simultaneously by all sensors in a set of search shoes.

The output of trigger circuit 67 causes one shot multivibrator 69 to switch to its unstable state which has a fixed time duration, as illustrated by pulse 70 of FIG. 9c. Pulse 70 is coupled through diode 72 and resistor 74 to integrator 75 having feedback capacitor 76.

LOoking now to channel B, input terminals 81, 82 83 are connected to respective magnetic heads in head stack 44 so that the input signals to channel B correspond to signals generated by sensors in the trailing set of search shoes 22, FIG. 1. Channel B is substantially identical to channel A and includes resistor network 84 and summing amplifier 55 which produce the summed output of FIG. 9b. Schmitt trigger circuit 87 fires when the pulse of FIG. b exceeds a predetermined magnitude, as described above, and in turn fires one shot multivibrator 89 whose output is the fixed duration pulse 90 of FIG. 9d. Pulse 90 is coupled through diode 92 and resistor 94 to integrator 95 having feedback capacitor 96.

Looking at the waveforms of FIGS. 9a through 9d it is understood that the time separation between the pulses of FIG. 9a and 9b is a function of the spacing between the leading and trailing sets of search shoes 21 and 22, FIG. 1, and of the speed of the pig. Therefore, as the pig speed varies the spacing between the pulses of FIG. 9a and 9b varies inversely. The same is true of the leading edges of the fixed duration pulses 70 and 90 of FIGS. 9c and 9d.

Returning now to the system illustrated in FIG. 8, pulse 70 of FIG. 9c is cross coupled over lead 97 to the emitter electrode of unijunction transistor 98 which shunts integrator 95 in channel B. Similarly, pulse 90 of FIG. 9d is cross coupled over lead 99 to the emitter electrode of unijunction transistor 100 which shunts integrator 75 of channel A.

The outputs of the two integrators 75 and 95 are coupled to respective input terminals of differential integrating amplifier 104 which is of conventional design. The output of differential integrating amplifier 104 is coupled to servo amplifier 106 which supplies the input signal to reversible motor 108. Motor 108 is mechanically coupled to cam 42 located between magnetic head stacks 43 and 44. It will be seen that head stacks 43, 44, cam 42 and magnetic tape 35 of FIG. 8 are substantially identical to the representation of FIG. 5, except for the mechanical coupling of cam 42 to motor 108.

Following is an explanation of manner in which the angular position of cam 42 is controlled as a function of the pig speed to automatically adjust the length of the path that magnetic tape 35 travels between head stacks 43 and 44 so as to automatically maintain alignment of girth weld signals on all tracks of an inspection log.

The transcribed simultaneously occurring signals which correspond to girth weld signals from tracks b, d, f of magnetic tape 35, are summed at the input portion of channel A and in response to the summed signals, FIG. 9a, Schmitt trigger circuit 65 fires and triggers one shot multivibrator 69 which produces the fixed time pulse 70 of FIG. 9c. The leading edge of pulse 70 initiates the integrating operation in integrator 75 and the ramp function waveform of FIG. 9e commences. At the same time, pulse 70 is cross coupled to unijunction transistor 98 which conducts to short out and disable integrator 95 in channel B. The output of integrator 95, therefore, is held at its reset level 112, FIG. 9f. The output of integrator 75 continues to fall until signals from head stack 44 are received at input terminals 81, 82, 83 of channel B. These signals are summed and the resultant signal, FIG. 9b, triggers Schmitt trigger circuit 87 which in turn fires one shot multivibrator 89 to produce the fixed duration pulse 90, FIG. 9d. This pulse is cross coupled over lead 99 to unijunction transistor 100 to short out and disable integrator 75 in channel A, thereby returning waveform of FIG. 9e to its base level 113. At this time, integrator 95 in channel B still is disabled because fixed duration pulse 70, FIG. 9c, from one shot multivibrator 69 in channel A has not yet terminated, thus maintaining unijunction transistor 98 in a conducting state.

Upon termination of pulse 70, FIG. 9c, pulse 90, FIG. 9d, still is present at the output of one shot multivibrator 89 in channel B and integration commences in integrator 95, FIG. 9f, and continues through the conclusion of pulse 90. Integrator 95 is reset to its initial condition 112′, FIG. 9f, by the occurrence of the next fixed duration pulse 70′, FIG. 9c, in channel A.

It thus is seen that the extent of run down of the ramp functions of waveforms of FIGS. 9e and 9f, and the time spacing between those two waveforms both are a function of the spacing between the summed girth weld signals of FIGS. 9a and 9b. As the pig speeds up in its travel through the pipeline the spacing between the pulses of FIGS. 9a and 9b will decrease and the run down of the waveforms of FIGS. 9e and 9f also will decrease. Just the opposite will occur as the pig speed decreases.

The output signals 9e and 9f from integrators 75 and 95 are combined in differential integrating amplifier 104 whose output, FIG. 9g, operates reversible motor 108. The rotary positions of motor 108 and cam 42 are functions of the pig speed and the system of FIG. 8 automatically is adjusted so that the length of the path traveled by magnetic tape 35 between head stacks 43 and 44 continually is adjusted to maintain to regions 38 and 39, see FIG. 3, over the respective head stacks. This assures alignment of the girth weld signals on the inspection log, as illustrated in FIG. 6.

In the event that the input signals to channel B proceed the occurrence of input signals to channel A, which would occur when the pig speed is high, the operation of the system of FIG. 8 would be similar to the operation described above, except for the relative time of occurrences of the waveforms associated with channels A and B. The input signal to motor 108 would be of opposite polarity to that described above and motor 108 and cam 42 would rotate in the opposite direction to shorten the path length that magnetic tape 35 travels between magnetic head stacks 43 and 44.

If the input signals to channels A and B arrive simultaneously at input terminals 61, 62, 63 and 81, 82, 83, both integrators 75 and 95 will be held in their reset conditions and no output is developed from differential integrating amplifier 104. This satisfies the requirement that a null condition must exist in the system of FIG. 8 when the cam 42 is properly positioned to achieve alignment of all girth weld signals on all tracks of the inspection log which is produced by the strip chart recording equipment.

It is to be understood that other follower or tracking systems may be used to accomplish the same purpose as the system illustrated in FIG. 8.

What is claimed is:

1. A method of making an inspection log representing anomaly signals produced by nondestructive inspection apparatus that passes through a pipeline, wherein said apparatus includes two longitudinally spaced sets of anomaly sensors and said two sets of sensors are respectively located in spaced planes transverse to said pipeline, at least one sensor in each set producing an anomaly signal when a given anomaly is sensed by said one sensor in each set, said method comprising the steps moving the inspection apparatus through the pipeline, moving a multitrack magnet recording tape past two spaced magnetic recording head stacks, wherein one head stack records on alternate tracks of the tape and the other head stack records on alternate tracks that are intermediate the first named alternate tracks, sensing said given anomaly with said one sensor in said first set and producing a first anomaly signal in response thereto, recording said first anomaly signal on a respective track of said magnetic recording tape, sensing said given anomaly with said one sensor in said second set and producing a second anomaly signal in response thereto, recording said second anomaly signal on a respective track of said recording tape at a location thereon which is longitudinally spaced from the location of the recorded first anomaly signal, playing back said recorded magnetic tape by passing it over two fixed magnetic playback head stacks which are spaced apart a distance which is different from the spacing between the two recorded anomaly signals on the magnetic tape, adjusting the length of the path that the magnetic tape travels between said fixed playback head stacks to bring each one of said recorded signals on the tape into registration with a respective one of said head stacks, and providing simultaneously occurring playback signals from the two head stacks in response to the two recorded signals on the magnetic tape passing over the head stacks.

2. The method claimed in claim 1 and including the further steps of producing a signal having a characteristic representative of the speed of the inspection apparatus moving through the pipeline, adjusting the length of the path that the magnetic tape travels between said fixed playback head stacks in response to said signal having a characteristic representative of the speed of the inspection apparatus.

3. A method of making an inspection log which represents anomaly signals produced by nondestructive inspection apparatus that passes through a pipeline, wherein said apparatus includes two longitudinally spaced sets of anomaly sensors all of which are capable of sensing a girth weld that extends around a section of the pipeline, each set of sensors lying in a plane transverse to the pipeline, said method comprising the steps moving a multitrack magnetic recording tape past two spaced magnetic recording head stacks, wherein one head stack records on alternate tracks of the tape and the other head stack records on alternate tracks that are intermediate the first named alternate tracks, sensing a girth weld with the first set of sensors to produce a first set of substantially simultaneously occurring anomaly signals, recording said first set of anomaly signals in transverse alignment on respective alternate tracks of said magnetic recording tape, sensing said girth weld with the second set of sensors to produce a second set of substantially simultaneously occurring anomaly signals, recording said second set of anomaly signals in transverse alignment on respective intermediate alternate tracks of said recording tape and at a location on the moving tape which is longitudinally spaced from the location where the first set of signals are recorded, transcribing the recorded signals on said magnetic tape by passing said tape past two fixed magnetic playback head stacks which are spaced apart a distance which is different from the spacing between said two recording locations on the tape, adjusting the length of the path that the tape travels between said fixed playback head stacks to make said two recording locations on the tape pass over respective ones of the playback head stacks at the same time, whereby the recorded signals on all of said tracks are transcribed substantially simultaneously.

4. The method claimed in claim 3 and further including the step of producing a visual multitrack strip chart record of said simultaneously transcribed signals, said visual record being made with recorded signals that correspond to signals from individual sensor means being on respective tracks and all signals corresponding to a given girth weld being transversely aligned on the record.

5. A method of transcribing a multitrack recording medium having at spaced locations thereon related recorded signals wherein a portion of the recorded signals occur in alignment on alternate tracks at a first one of the locations and another portion of the recorded signals occur in alignment on intermediate alternate tracks at the second one of the spaced locations, and wherein the transcribing apparatus employs two spaced multitrack signal transcribing means which are spaced apart by a fixed distance which differs from the distance between said spaced locations on the recording medium, said method comprising the steps of passing said recording medium past said multitrack signal transcribing means, adjusting the length of the path of travel of said recording medium between said fixed signal transcribing means to bring said spaced locations on the recording medium into registration with respective ones of the signal transcribing means, and simultaneously transcribing from all tracks of the recording medium said recorded signals located at said spaced locations.

6. A method of transcribing a multitrack magnetic recording tape having at two longitudinally spaced locations thereon related recorded signals wherein a portion of the recorded signals occur in transverse alignment on alternate tracks at a first one of said locations and another portion of the recorded signals occur in transverse alignment on intermediate alternate tracks at the second one of the spaced locations, and wherein the transcribing apparatus includes two spaced transcribing magnetic head stacks which are longitudinally spaced apart by a fixed distance which differs from the distance between said two spaced locations on the magnetic tape, said method comprising the steps passing said magnetic tape along a path between said two head stacks to bring the tracks of the magnetic tape into transcribing relationship with the respective head stacks, adjusting the length of said path between the head stacks to bring said two spaced locations on the tape into registration with respective ones of the head stacks, and simultaneously transcribing from all tracks of said tape the related signals recorded at the two locations on said tape.

7. Apparatus for making an inspection log representing anomaly signals produced by nondestructive inspection apparatus that passes through a pipeline, wherein the apparatus includes two longitudinally spaced sets of anomaly sensors which are arranged in respective planes transverse to the intended direction of travel of the apparatus, said apparatus comprising multitrack magnetic tape recording apparatus including a magnetic recording tape and two magnetic recording head stacks for recording anomaly signals from said sets of sensors in interlaced fashion on said magnetic tape, multitrack magnetic tape playback equipment for playing back recorded signals on said magnetic tape, said playback equipment including two playback magnetic head stacks spaced a fixed distance apart, means for adjusting in a controlled manner the length of the path that a magnetic tape travels between said fixed playback head stacks.

8. The apparatus claimed in claim 7 and further including means for generating a signal having a characteristic representative of the speed of the inspection apparatus moving through a pipeline, means responsive to said signal having a characteristic representative of speed coupled to and controlling said means for adjusting the length of said path, thereby to adjust said path length in response to a change in speed of the inspection apparatus through a pipeline.

9. Apparatus for transcribing a multitrack magnetic recording tape having at two longitudinally spaced locations thereon related recorded signals wherein a portion of the recorded signals occur in transverse alignment on alternate tracks at a first one of said locations and another portion of the recorded signals occur in transverse alignment on intermediate alternate tracks at the second one of the spaced locations, and wherein the transcribing apparatus includes two fixed magnetic head stacks which are longitudinally spaced apart by a distance which differs from the distance between said two spaced locations on the magnetic tape, comprising means for moving said magnetic tape along a path between said two head stacks to bring the tracks of the magnetic tape into transcribing relationship with the respective head stacks, means for adjusting the length of the path said tape travels between the fixed head stacks to maintain said spaced regions on the tape in registration with said fixed head stacks.

10. Apparatus claimed in claim 9 wherein the means for changing the length of said path is comprised of tape engaging means for engaging said tape as it moves between said fixed head stacks, and means for changing the position of said tape engaging means relative to said fixed head stacks.

11. The apparatus claimed in claim 10 wherein said tape engaging means is a cam having a peripheral surface adapted to make a sliding contact with said magnetic tape, said cam being adjustably positioned to change the length of said path.

* * * * *